Sept. 11, 1934.   J. V. MARTIN   1,973,007
HIGH WING AEROPLANE
Filed Oct. 1, 1929   4 Sheets-Sheet 1
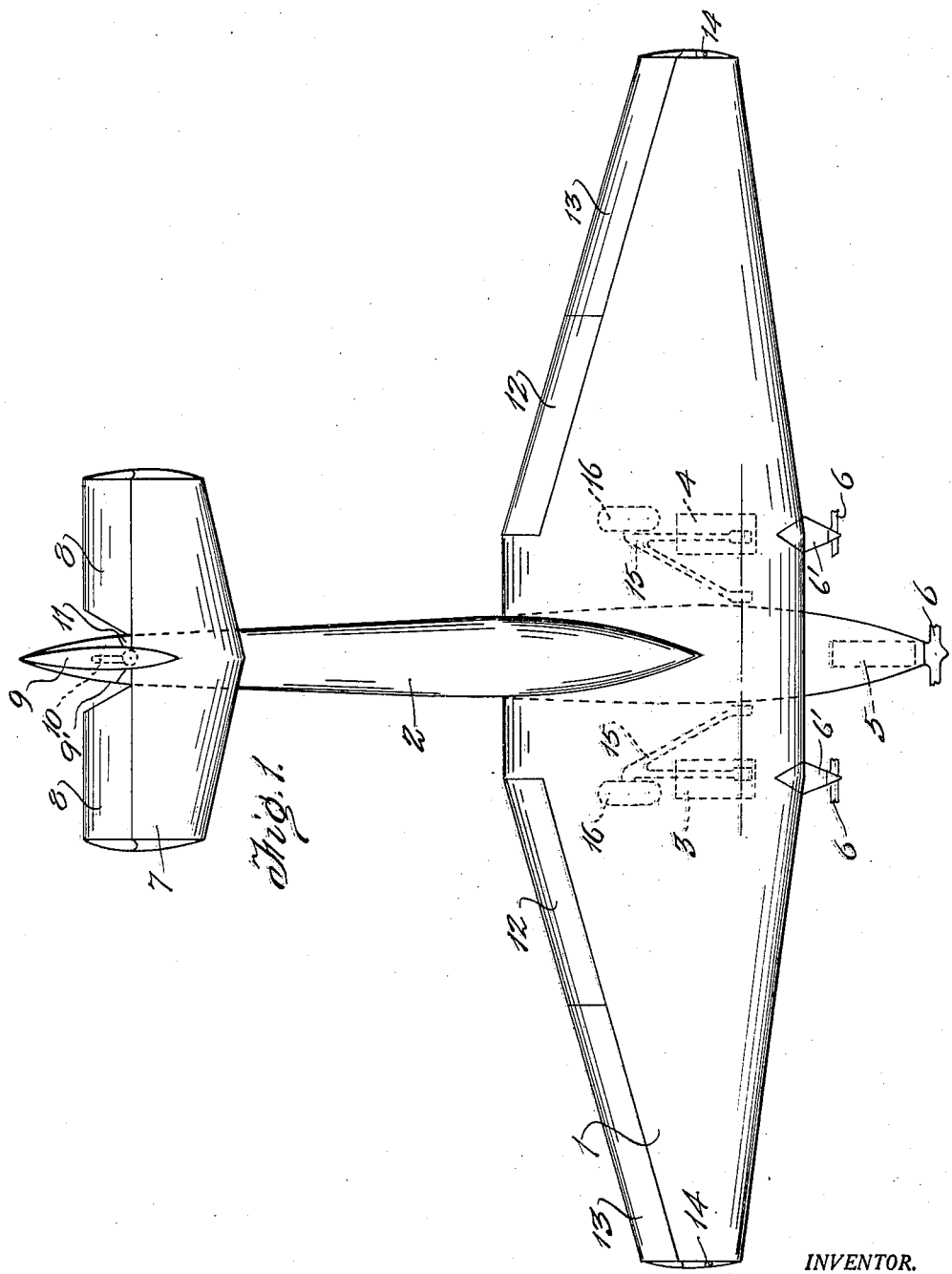

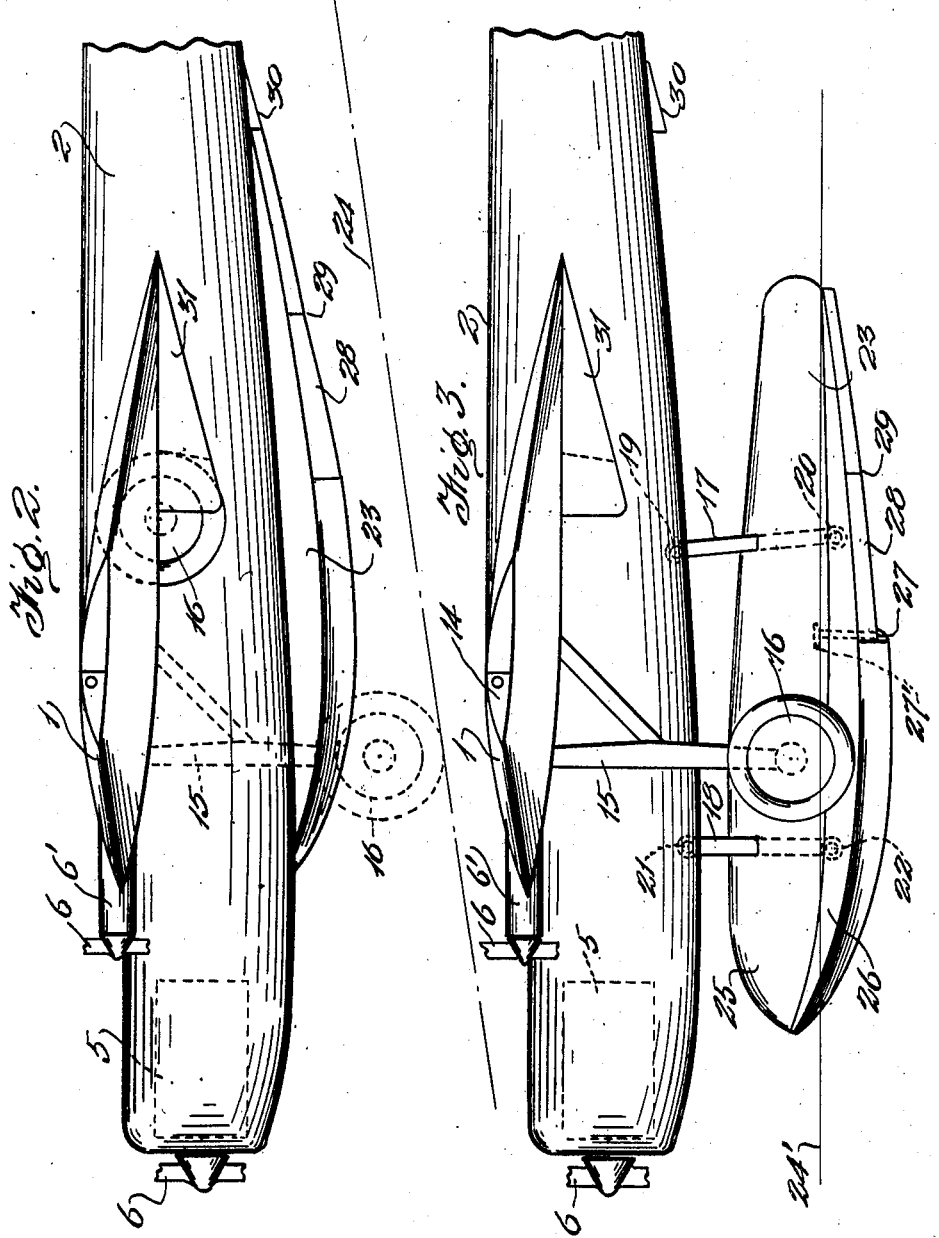

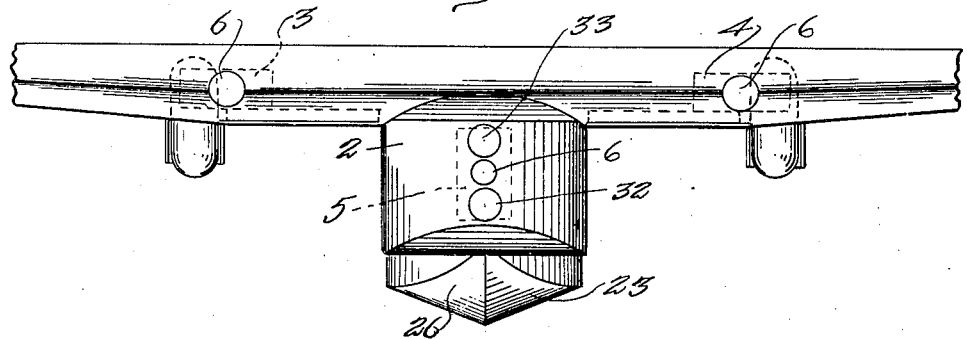

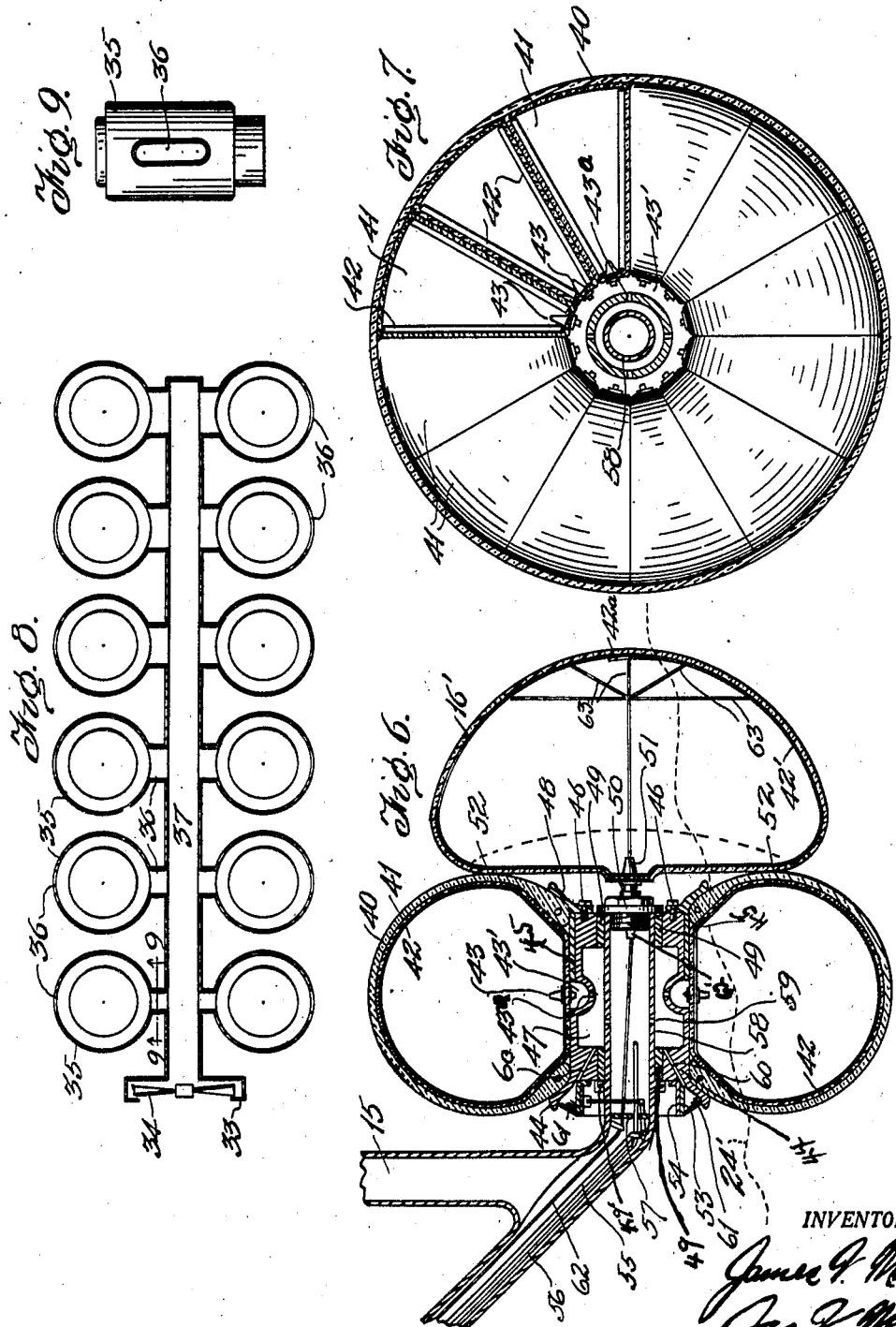

Patented Sept. 11, 1934

1,973,007

UNITED STATES PATENT OFFICE 1,973,007

HIGH WING AEROPLANE

James V. Martin, Garden City, N. Y.

Application October 1, 1929, Serial No. 396,488

12 Claims. (Cl. 244—2)

This invention relates to improvements in running and alighting devices for vehicles and more particularly to amphibians and to means for suspending and propelling the same for land, air and water operation.

One of the objects of my invention is to simplify the alighting gear of aeroplanes so that the same means which permits the aeroplane to roll over the ground can be used to balance the aeroplane when it floats on the surface of the water.

A further object of my invention is to provide a type of low pressure tire which will not cause the aeroplane to bounce so much as the higher pressure tires do and to make the tire relatively safe from becoming flat if a puncture occur.

A further object of my invention is to provide a self inflating type of low pressure tire and to adapt the said tire for use as an auxiliary float, and to combine an efficient form of brake with the said tire.

A still further object of my invention is to provide a new arrangement of motor cylinders within an aeroplane fuselage, so that they may be cooled more effectively.

Further objects of my invention will become readily apparent from an inspection of the drawings as elucidated hereafter:—

Fig. 1 is a plan view of a monoplane equipped with my invention and

Fig. 2 is a side elevation of the said monoplane showing the chassis in dotted lines in extended position and both the central pontoon and chassis retracted in full lines.

Fig. 3 shows the same monoplane in side elevation, but with both the central pontoon and the wheel type floats in extended position ready to support the monoplane upon the surface of the water.

Fig. 4 shows the monoplane in front elevation with both wheels and float retracted for full flight operation, and Fig. 5 shows the same front elevation with wheels and float in extended position.

Fig. 6 shows a cross section through one of the wheel type floats and parts of the two port side struts, and Fig. 7 shows a view radially and partly in section of the tire and its self inflating bags.

Fig. 8 shows a horizontal section through the upper V banks of the motor cylinders to illustrate the air flow cooling, and Fig. 9 shows a typical oval shaped slot in a cylinder jacket.

Proceeding now, with the more detailed description of the invention, like numerals are employed to designate similar parts throughout the several views:

1 indicates a typical monoplane wing of the double convex type as disclosed in my Patent No. 1,771,053 of July 22, 1930 and copending application Serial No. 675,156. 2 indicates an aerofoil type of fuselage arranged below the thickest part of the wing with a motor 5 in dotted lines in its forward part. 3 and 4 indicate motors located within the wing and driving propellers 6 supported by a streamlined housing 6'. 7 is a horizontal stabilizer having operable flaps attached and 9 indicates a float type of rudder having a tail skid 10 inclosed within its widened float portion 9' as more fully disclosed in my Patent No. 1,464,209 of Aug. 7, 1923; 11 indicates a cutout portion of the rudder float 9' for turning which is faired in smoothly by sheet metal having a loose end or flexible material as thin rubber: The tail skid is more fully disclosed in my copending applications already referred to.

12 indicates trailing edge flaps for raising the low speed lift of the wing while 13 indicates trailing edge ailerons and 14 an inclosed navigation light. 15 indicates the chassis frame of the auxiliary floats as more fully disclosed in my Patent No. 1,431,017 of Oct. 3, 1922 and 16 indicates these float type wheels and 16' an extra buoyancy float. 17 indicates the rear struts for the collapsible retractable pontoon journaled respectively at 19 within the lower portion of the fuselage and at 20 within the upper rear portion of the lower or rigid portion of the pontoon 23; 18 indicates the front struts of the pontoon and 18' the diagonal strut and 21 and 22 like attachments to 19 and 20 already described.

24 indicates the landing angle when the wheels are extended for use on land as indicated in Fig. 2 and the pontoon is out of the way through retraction as indicated. 24' in Fig. 5 indicates the water level for normal loading, when the amphibian is floating upon the surface of the water, its weight being taken mostly by the central pontoon and its balance upon that pontoon being maintained by the auxiliary floats 16 and 16'.

25 is the balloon portion or inflated upper section of the pontoon and 26 the rigid lower portion of 23 as more clearly disclosed in my Patent No. 1,728,621; it is provided with a step 27 air vented by a pipe 27' and having a false bottom 28 hinged at 29 so that when the telescoped portion of the pipe 27' is pushed down, as when the top of the pontoon is deflated and the pontoon collapsed against the bottom of the fuselage, the false bottom 28 will streamline the hydro-step as shown in Fig. 2. 30 is a streamline form to complete the streamlining of the pontoon 23 in its retracted position and 31 is another rear streamline for the wheels 16 when they are retracted partly therein and partly within the wing 1.

Studying the new form of wheel-float more particularly I find an outer casing or tire 40, Figs. 6 and 7, having sectional inner tubes 41, which are provided with light steel flat springs 42 and one way valves 43 which extend into a recess 43' in the tire rim 44: this rim has one of its flanged parts 45 telescoping over the other part and over studs 46, which secure it in place after the straight side type tire has been placed between the rim flanges 48. A hole 43a in the recess 43' admits air from the hub chamber 47 and 48 is a typical flange on the rim 44, while 49 is an oil impregnated bushing protected from dust by dust washers 49'. The rim 44 is held in place upon the axle tube 58 by a flange and nut 50 and a one way valve 51 is secured in the said nut and flange center and a cord to the pilot's position passes through the said valve so as to open it when pulled for the deflating of the extra float 16'. This extra float is attached to the external surface of the tire float 16 at 52 in any suitable manner and the cord 62 is provided with a swivel 62': 53 indicates a brake drum and 54 an internal type brake band operates in any of a number of customary ways as by the brake rod 55 running through the chassis strut to the pilot's position in the fuselage. 56 indicates an air tube from a compressed air bottle or servo motor under the pilot's control to furnish compressed air to the chamber within the axle 58, which is closed on one side by the flange and nut 50 and on the other by partition 57, a hole 59 allows air to pass from within 58 to the chamber 47 and thence through holes 43a to the valves 43: 60 indicates air passages from air cups 61 into the chamber 47 and it is contemplated that when the air line 56 is in use that these passages 60 will be closed and not needed. 62, the cord to pilot's position from within 16' ramifies into attachments 63 which pull the extra float 16' into collapsed position indicated in dotted lines, Fig. 6, against the resistance of light steel springs 42'.

Looking at Figs. 8 and 9 we see the fan housing 33 and the fan 34, which has a continuous number of blades so that it completely fills the area of its encompassing circle and puts an air pressure into the passage 37 from which the compressed cool air passes through short oval pipes 36 within an air jacket 35 around each motor cylinder and exits on the opposite side through a similar opening.

As indicated by the dotted lines of Figs. 1-4 the banks of the cylinders extend vertically up and down in the fuselage from the crankcase.

In operation my invention is used to replace wing end floats or other means of balancing the aeroplane on its central float and the wavy dotted line 24' indicates how the water normally will strike the wheel type floats (Fig. 6) when that side is the lowest on one side of the central float. The position of the frame 15 and the wheel 16 under the part of the wing supporting the motors is important as it affords support where great weight is located and permits the chassis when retracted to occupy a position in the wing to rearward of the motor. It is contemplated that the extra sized tire will have so much area that it will have great buoyancy and also that it will support the aeroplane while rolling on the ground, although very little or no air is within the air bags 41; in other words this type tire will be so large in area that it will roll if it has only normal atmospheric pressure within it and the springs 42 will insure this, in that they expand each air bag 41 when relieved of the plane's weight and this causes the external air to come into the bag through the valves 43 which hold it against exit. Furthermore, while the usual form of pneumatic tire requires the compression of the air within the entire tire, the present invention builds up the air pressure resistance very much faster in that, with a comparatively big deformation under load the new tire will compress the air only within 3 or 4 of the air bags. Such a tire should prove of use on automobiles as well as aeroplanes, eliminating danger of flats from blow outs: Even where one or more bags have punctures in them, they will have a chance to recover atmospheric air pressure within them when relieved of the load between the hub and the ground and when again subjected to that load will support the automobile or plane because the puncture will not permit the escape of air as fast as the tire turns a bag through the loaded arc.

Thus three distinct ways of filling the above tire are shown, 1, that described above, next that of using the fan blades 61 to pump air pressure within the chamber 47 and lastly by means of a pressure line 56 from an air pump or other source.

Of course when the float type wheels are used for ground alighting the central pontoon will be collapsed and retracted and the extra float 16' can remain collapsed as it is when the wheels are retracted.

Thus it will be observed that I have accomplished the design of a practical float and ground alighting chassis in one retracting mechanism in place of the two heretofore needed and have at the same time been able to obtain the efficiency and vision of the "Highwing" type plane.

A wide variation of my invention will be possible without departing from its teaching and I do not limit myself to the detailed disclosure.

What I claim is:—

1. In combination with a hydroaeroplane a vehicle tire having an auxiliary inflatable bag for cooperative buoyancy together with the said tire as a balancing rotatable float for said hydroaeroplane.

2. A combined water balancing float and ground wheel for an amphibian including an inflated large cross section tire rotatably mounted upon a comparatively small diameter rim the said tire held in spaced apart relation to the said amphibian by a frame and means passing through the inclosed portions of the said frame to inflate the said tire.

3. The combination according to claim 2 and an auxiliary inflatable float extending axially beyond the end of the said rim.

4. In combination with an amphibian, an auxiliary balancing float comprising an oversized tire fitted upon a comparatively small diameter rim and an additional air inflated float extending in the rotational plane and on one side of the said tire.

5. The combination according to claim 4 and means to inflate and deflate the said additional float operable from the pilot's position.

6. An inflatable balancing float for a hydroaeroplane disposed on one side of a central water support and held rotatably by a retractable frame in spaced apart relation to the said hydroaeroplane and means passing through the said frame to deflate the said float.

7. A hydroaeroplane provided with multiple motors and a retractable alighting tire located under each said motor, means to retract and house part of each said tire within the lower wing surface and means operable in flight to inflate and deflate the said tires in their extended positions, the said tires adapted to act as balancing floats for the said hydroaeroplane about a centrally located retractable float.

8. In combination with a hydroaeroplane having a centrally located retractable pontoon, retractable tires and rims to support the said hydroaeroplane on the ground and the said tires of greater cross-sectional dimension than the rim diameters and in one of their adjustable positions held securely above the said pontoon bottom to balance the said hydroaeroplane on the surface of the water.

9. In combination with an amphibian having a centrally located pontoon and a steerable rearwardly located pontoon, an air inflated rotatable float for lateral balance on the surface of the water, means to retract and extend the said float so that the lowest adjustable position thereof will be above the lowest bottom portion of the said pontoon and yieldable ground engaging means under the said rearwardly located pontoon.

10. In combination with an amphibian having a wing and a central float, an auxiliary rotatable balancing float extendible from the said amphibian wing by means of a retractable frame, and means passing through the said frame to inflate the said float in its extended position, the said central float being retractable to a position which permits the said rotatable float to contact the ground in normal attitude of the said amphibian.

11. In combination with an amphibian having three retractable and inflatable floats, the two outer said floats being rotatable and the central said float being retractable to a position which permits the said outer floats to serve as ground alighting tires.

12. The combination in an amphibian of a centrally located float and a retractable rotatable float on either side of the said central float, and means during flight to adjust the relative positions of the said central and side floats, the side floats held securely below the lowest position of the bottom of the said central float in one of the said positions and above the said float's lowest position in another, and a frame subtending and spacing the said rotatable floats from the said amphibian.

JAMES V. MARTIN.